United States Patent [19]

Pérez Méndez et al.

[11] Patent Number: 6,165,382
[45] Date of Patent: Dec. 26, 2000

[54] PROCESS FOR OBTAINING CHOLESTERIC LIQUID CRYSTALS BY STEREOSELECTIVE RECRYSTALLIZATION

[75] Inventors: María Mercedes Pérez Méndez; Carlos Marco Rocha, both of Madrid, Spain

[73] Assignee: Consejo Superior de Investigaciones Cientificas, Madrid, Spain

[21] Appl. No.: 09/341,907

[22] PCT Filed: Jan. 16, 1998

[86] PCT No.: PCT/ES98/00006

§ 371 Date: Sep. 13, 1999

§ 102(e) Date: Sep. 13, 1999

[87] PCT Pub. No.: WO98/31771

PCT Pub. Date: Jul. 23, 1998

[30] Foreign Application Priority Data

Jan. 20, 1997 [ES] Spain .................................... 9700100

[51] Int. Cl.$^7$ ........................ C09K 19/52; C09K 19/20; C08G 63/02
[52] U.S. Cl. ............... 252/299.01; 252/299.67; 528/192
[58] Field of Search ................ 252/299.01, 299.67; 528/192

[56] References Cited

U.S. PATENT DOCUMENTS

| | | | |
|---|---|---|---|
| 4,412,059 | 10/1983 | Krigbaum et al. | 528/192 |
| 5,891,532 | 4/1999 | Furuta et al. | 428/1 |
| 6,071,438 | 6/2000 | Leigeber et al. | 252/585 |

FOREIGN PATENT DOCUMENTS

| | | |
|---|---|---|
| 0 218 369 | 4/1987 | European Pat. Off. . |
| 0251 688 | 1/1988 | European Pat. Off. . |

OTHER PUBLICATIONS

Chiellini et al., Macromolecules, (1990) 23 (8) 2106–12.
Chiellini et al., Polym. Bull., (1983) 9(6–7), 336–43, 1990.
Chiellini et al., 1990, Mol. Cryst. Liq. Cryst. 179:405–18.

*Primary Examiner*—C. H. Kelly
*Attorney, Agent, or Firm*—Klauber & Jackson

[57] ABSTRACT

Process for synthesizing polymers+PTOBEE $(C_{26}H_{20}O_8)_n$ and PTOBDME $(C_{34}H_{36}O_8)_n$, with the addition of acid dichloride and DL treo-1,2-butanediol in Cl-naphthalene and DL-1,2-dodecanediol with diphenyl oxide, respectively, by passing them through a nitrogen stream at room temperature, heating the mixture, settling in toluene the mixture and filtering. In the resulting settling toluene, the polymer precipitates the enantiomer (–)PTOBEE. The compounds obtained are of the cholesteric liquid crystal type, obtained by stereoselective recrystallization in toluene.

2 Claims, No Drawings

PROCESS FOR OBTAINING CHOLESTERIC LIQUID CRYSTALS BY STEREOSELECTIVE RECRYSTALLIZATION

FIELD OF APPLICATION

The present invention fits within a first chemical sector with optical implications (response sensitive to temperature: thermal indicators and radiation sensors), as well as biological ones due to their liquid crystal nature (W. Elser and R. D. Ennulat, "*Advances in Liquid Crystals*", Vol. 2, Brown, G. H. (De.), Academic Press, New York, 1976, pp. 73).

Liquid crystals are self-organizable systems. They do not pass directly from the crystalline state to the isotropic melt, when being heated, but rather they form mesophases that combine the order of the perfect crystal with the mobility of the liquid. Their molecular base is almost always simple: they form anisotropic or amphiphilic molecules with a rigid geometry (mesogenic unity) connected to another flexible part (spacer), that package in blocks with anisotropic properties (H. Ringsdorf, B. Schlarb and J. Venzmer, "*Molecular Architecture and Function of Polymeric Oriented Systems: Models for the Study of Organization, Surface Recognition, and Dynamics of Biomembranes*", Ang. Chem. Int. De. Engl. 1988, 27, pp. 116). the parallel orientation of their longitudinal molecular axis is common to all mesophases. Two main types may be distinguished: Nematic (with their molecular centers distributed isotropically) and smectic (molecular centers distributed isotropically (and smectic (molecular centers organized in planes). The spatial arrangement of nematic planes stacked in a helicoid superstructure, characterized by a preferably chirality, is known as cholesteric mesophase. Cholesteric mesophases reflect incident light and when their helix pitch is comparable to the wavelength of the visible light, they exhibit typical bright colors.

The development of polymer liquid crystals followed that of monomer liquid crystals and began with polymers whose main chain, as a whole, acted as a mesogene, those prepared from a solution (lyotropic) as well as those prepared from a melt (thermotropic). Subsequently, the mesogenic units were introduced well hung from the main chain by means of a flexible spacer (of side chain) or connected all along the main chain by a flexible aliphatic spacer (of main chain).

In 1982, Lenz et al (C. Ober, J. I. Jin. R. W. Lenz, Polym. J. 1982, 14, 9) synthesized thermotropic polymer liquid crystals whose mesogenic unity, previously studied in works of low molecular weight, based on a central residue of terephthalic acid flanked by two p-oxybenzoil residue connected by flexible polymethylene spacers. High transition temperatures were obtained from transition to the mesophase and to the isotropic melt.

Galli et al. (G. Galli, E. Chiellini, C. K. Obert, R. W. Lenz, Makromol. Chem. 1982, 183, pp. 2693) in 1982 also introduced to the mesogene itself flexible spacers compatible with the aqueous system under physiological conditions, that is to say, hydrophilic spacers with a low molecular weight with hydroxy ending, of the oligo oxyethylene and olio oxypropylene type, the latter containing chiral centers in each unit. These spacers had also been used in low molecular weight liquid crystals, for the purpose of reducing the transition temperatures. The influence of the type, length and distribution of the spacers on the behavior of the formed mesphases was observed, limiting the liquid crystal nature of the polymers to 10 units in the spacer.

In 1983, Malanga et al. (C. Malanga, N. Spassky, R. Menicagly, E. Chiellini, Polymer Bulletin 1983, 9, pp. 336) extended the synthesis, using as flexible spacers optically active dioles with a different length and degree of substitution, capable not only of giving the polymers a hydrophilic nature but also the cholesteric stereochemical arrangement to the mesophase thereof. Starting with chiral glycols (an enantiomer of a specific sign) as the spacer, a polymer with the same optical sign was obtained in all cases. Starting with the racemic mixture of glycol as the spacer, a "racemic" non-chiral polymer with a nematic, never cholesteric, mesophase was always obtained (E. Chiellini, R. Po, S. Carrozzino, G. Galli and B. Gallot, "*Chiral Liquid-Crystalline Polymers. IX. The Effect of Chiral Space Structure in Thermotropic Polyesters*", Mol. Cryst. Liq. Cryst. 1990, Vol. 179, 405–418; E. Chiellini, R. Solaro, G. Leonardi, R. Lisciani, G. Mazzanti, Eur. Pat. Appln. 19, pp., EP 509968 A1 921021; E. Chiellini, R. Solaro, L. Bemporad, S. D'Antone, Eur. Pat. Appln., 11, pp., EP 486445 A2 920520; E. Chiellini, R. Solaro, L. Bemporad, Eur. Pat. Appl., 13 pp. EP 486437 A2 920520).

The concept of selective recrystallization is a very important concept nowadays in organic chemistry (P. Renaud, T. Bourquard, M. Gerster, N. Moufid, *Stereoselective Reactions of Sulfinylated Benzyl Radicals: Effect of Solvents and Lewis Acids*", Agnew. Chem. Int. De. Engl., 1994, 33, No. 15/16, 1601–1603; R. Tamura, S. Susuki, N. Azuma, A. Matsumoto, F. Toda, A. Kamimura, K. Hori, "*Preparation of Chiral Nitroxide Radicals and Spontaneous Optical Resolution by Recrystallization*", Agnew. Chem. Int. De. Engl., 1994, 33, No. 8, 878–879; H. J. Federsel, "*Chirotechnology. Industrial Synthesis of Optical Active Compounds*", Angew. Chem. Int. De. Engl. 1994, 33, No. 9, 1013). The separation of racemic mixtures in their two enantiomers is so complex, expensive and laborious that the stereoselective crystallization of a component in a specific solvent proves to solve many practical problems, aside form its undeniable industrial and economic interest.

DESCRIPTION OF THE INVENTION

The technological and biological interest of thermotropic polyesters with a chiral nature led us to propose the synthesis of these materials by using spacers with asymmetric carbon in their molecular formula and different lengths in the lateral aliphatic chain of the flexible spacer, that do not exceed in their length the critical length in order to have the liquid crystal nature.

In the present invention the same mesogenic unit as Chiellini et al: [HTH=4,4'-dioxyterephtaloyl dibenzoic acid] in the main chain and two different glycols as the spacer that have given rise to two different thermotropic polyesters, have been used.

The present invention refers to a process for obtaining cholesteric liquid crystals, (-)PTOBEE or cholesteric PTOBDME, comprising the steps of preparing a mixture by adding 4,4'-dioxyterephtaloyl dibenzoic acid dichloride and, for obtaining PTOBEE Dl-treo-1,2-butadiol to Cl-naphthalene or, for obtaining PTOBDME, Dl-treo-1,2-dodecanediol to diphenyl oxide, passing a nitrogen stream through the mixture, at room temperature for more than 35 minutes (for obtaining PTOBEE);

or for more than 30 minutes (for obtaining PTOBDME);

heating the mixture above 100° C. in a nitrogen stream for more than 3 hours;

settling the mixture in toluene, filtering, drying with a vacuum pump and washing with ethanol in order to remove the Cl-naphthalene (for obtaining PTOBEE) whereby PTOBEE $(C_{26}H_{20}O_8)_n$ polymer or PTOBDME is respectively obtained;

keeping the toulene dissolution resulting from settling the PTOBEE or PTOBDME polymer in an airtight space;

and obtaining (−) PTOBEE or cholesteric PTOBDME from the dissolution by precipitation, filtering and drying.

EXAMPLE 1

4.5 g of TOBC acid dichloride $(C_{22}H_{12}O_6C_{12})$ and 0.92 g of DL-treo-1,2-butanediol in 25.5 ml. of Cl-naphthalene were added to a 50 c.c. flask provided with a magnetic stirrer, a heating plate and a bulb condenser. This was passed through a nitrogen stream at room temperature for 35 minutes. Afterwards, this was heated to above 100° C. in a $N_2$ stream, for 3 hours. Afterwards, the contents of the flask was settled in toluene, dried in a vacuum pump and washed with ethanol in order to wash off the Cl-naphthalene. The polymer thus obtained is PTOBEE $(C_{26}H_{20}O_8)$, characterized by NMR as:

obtained which once it has been analyzed by NMR, confirms the structure of (−) PTOBEE. Its Optical Rotary Dispersion (ORD) value is $[\alpha]25589=2.33$ [0.0056 mol/l, toluene]. The crystallinity evidenced by Differential Scan Calorimetry (DSC) is higher than the one shown by the original product of synthesis PTOBEE, previously precipitated in toluene and filtered. This product, (−) PTOBEE, is therefore considered, to be obtained by stereoselective recrystallization in toluene, starting with the product of synthesis. Its nature is cholesteric liquid crystal.

EXAMPLE 3

4.5 g. of TOBC and 2.05 g. Of DL-1,2-dodecanediol with 25.37 ml. of 25.4 ml. of diphenyl oxide are added to a 50 c.c. flask. This is passed through a nitrogen stream for 30 minutes at room temperature and afterwards it is heated to above 100° C. in a $N_2$ stream for 3 hours. The transparent solution is settled in 250 ml. of toluene, filtering the precipitate and drying it in a vacuum pump. Later on, it is washed in ethanol, filtered and dried in a vacuum.

The NMR structure of this new polymer PTOBDME $(C_{26}H_{20}O_8)$ proves to be:

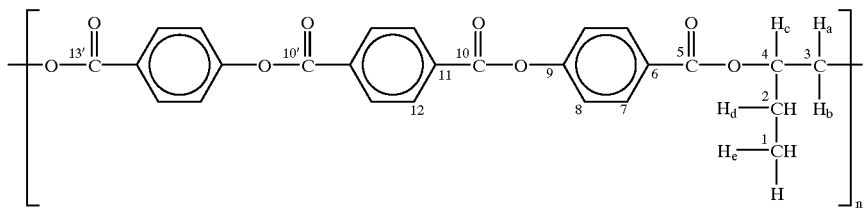

This compound has been reported by Chiellini (6) as nematic liquid crystal.

We report it as cholesteric liquid crystal.

EXAMPLE 2

The toluene solution resulting from settling the polymer after its synthesis is clear and transparent, and kept in an airtight room. Some time afterwards a white precipitate is

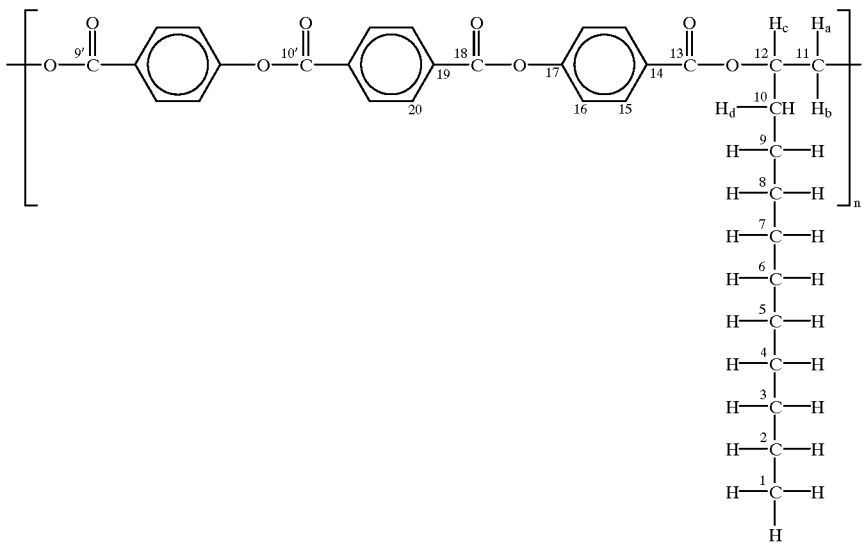

Its nature is cholesteric liquid crystal.

What is claimed is:

1. A process for obtaining cholesteric liquid crystals, the process comprising the steps of preparing a mixture by adding 4,4'-dioxyterephtaloyl dibenzoic acid dichloride and Dl-treo-1,2-butadiol to Cl-naphthalene and passing a nitrogen stream through the mixture, at room temperature for more than 35 minutes;

heating the mixture above 100° C. in a nitrogen stream for more than 3 hours;

settling the mixture in toluene, filtering, drying with a vacuum pump and washing with ethanol in order to remove the Cl-naphthalene; whereby PTOBEE $(C_{26}H_{20}O_8)_n$ polymer is obtained;

keeping the toluene dissolution resulting from settling the PTOBEE polymer in an airtight space; and obtaining (−) PTOBEE from the dissolution by precipitation, filtering and drying.

2. A process for obtaining cholesteric liquid crystals, the process comprising the steps of preparing a mixture by adding 4,4'-dioxyterephtaloyl dibenzoic acid dichloride and Dl-treo-1,2-dodecanediol to diphenyl oxide and and passing a nitrogen stream through the mixture, at room temperature for more than 35 minutes;

heating the mixture above 100° C. in a nitrogen stream for more than 3 hours;

settling the mixture in toluene, thereby obtaining a precipitate which is subjected to filtering, drying with a vacuum pump and washing with ethanol, filtering and drying thereby obtaining PTOBDME polymer;

keeping the toluene dissolution resulting from settling the PTOBEE polymer in an airtight space; and obtaining cholesteric PTOBDME from the dissolution by precipitation, filtering and drying.

* * * * *